United States Patent
Huang et al.

(10) Patent No.: US 12,536,245 B2
(45) Date of Patent: Jan. 27, 2026

(54) NEURAL NETWORK-BASED NARMA-L2 MULTIVARIABLE CONTROL METHOD

(71) Applicant: NANJING UNIVERSITY OF AERONAUTICS AND ASTRONAUTICS, Jiangsu (CN)

(72) Inventors: Jinquan Huang, Jiangsu (CN); Jie Tang, Jiangsu (CN); Feng Lu, Jiangsu (CN); Xiaojie Chou, Jiangsu (CN); Yahui Gao, Jiangsu (CN); Haiqin Qin, Jiangsu (CN)

(73) Assignee: NANJING UNIVERSITY OF AERONAUTICS AND ASTRONAUTICS, Jiangsu (CN)

( * ) Notice: Subject to any disclaimer, the term of this patent is extended or adjusted under 35 U.S.C. 154(b) by 1038 days.

(21) Appl. No.: 17/630,527

(22) PCT Filed: May 24, 2021

(86) PCT No.: PCT/CN2021/095598
§ 371 (c)(1),
(2) Date: Jan. 27, 2022

(87) PCT Pub. No.: WO2022/037157
PCT Pub. Date: Feb. 24, 2022

(65) Prior Publication Data
US 2022/0374491 A1  Nov. 24, 2022

(30) Foreign Application Priority Data
Sep. 28, 2020  (CN) .......................... 202011036705.0

(51) Int. Cl.
*G06F 17/11* (2006.01)
*G06F 17/16* (2006.01)

(52) U.S. Cl.
CPC .............. *G06F 17/11* (2013.01); *G06F 17/16* (2013.01)

(58) Field of Classification Search
CPC ...... F02C 9/26; F02C 9/28; F02C 9/44; F02C 9/48; F02C 9/50; F05D 2220/30;
(Continued)

(56) References Cited

U.S. PATENT DOCUMENTS 4,258,545 A * 3/1981 Slater ........................ F02C 9/00
 60/238
4,928,484 A * 5/1990 Peczkowski .............. F02C 9/28
 60/39.27

(Continued)

FOREIGN PATENT DOCUMENTS

CN  105184416  12/2015
CN  109162813  1/2019

(Continued)

OTHER PUBLICATIONS

Wang, Lei et al., "Multi-step predictive control for aero-engine distributed control system based on RVM regression error compensation," Journal of Aerospace Power, vol. 28, No. 6, Jun. 2013, pp. 1420-1428.
(Continued)

*Primary Examiner* — Courtney D Heinle
*Assistant Examiner* — Ryan C Clark
(74) *Attorney, Agent, or Firm* — JCIPRNET (57) ABSTRACT

The present invention discloses a neural network-based NARMA-L2 multivariable control method, which includes: deriving a NARMA-L2 multivariable control law of a nonlinear discrete system; using neural networks to offline identify nonlinear functions in the control law; designing the controller with the control law, designing a closed-loop control system for a certain type of turbofan engine, and
(Continued)

adding the function of making the online update of neural network errors on the basis of this to correct the controller parameters, and studying the tracking performance of the control system. Aimed to minimize the quadratic performance index for the errors of the engine's high-pressure rotating speed and pressure ratio, by using neural networks in combination with the deduced NARMA-L2 multivariable control law, the present invention has designed a dual-variable controller, calculated the engine's control variables and controlled the fuel flow of the engine and the critical interface area of the exhaust nozzle.

15 Claims, 5 Drawing Sheets

(58) Field of Classification Search
CPC ......... F05D 2220/32; F05D 2220/3212; F05D 2220/323; F05D 2260/81; F05D 2260/821; F05D 2270/02; F05D 2270/301; F05D 2270/304; F05D 2270/709; F05D 2270/71
See application file for complete search history.

(56) References Cited

U.S. PATENT DOCUMENTS

| | | | | |
|---|---|---|---|---|
| 2018/0223742 | A1* | 8/2018 | Demougeot | F02C 7/057 |
| 2018/0300737 | A1 | 10/2018 | Bledsoe et al. | |
| 2018/0328287 | A1* | 11/2018 | Moniz | F04D 29/563 |

FOREIGN PATENT DOCUMENTS

| | | | | |
|---|---|---|---|---|
| CN | 109162813 A | * | 1/2019 | F02C 9/28 |
| CN | 110195660 A | * | 9/2019 | F02C 9/28 |
| CN | 110513199 | | 11/2019 | |
| CN | 110513199 A | * | 11/2019 | F02C 9/48 |
| CN | 110985216 | | 4/2020 | |
| CN | 110985216 A | * | 4/2020 | F02C 9/00 |
| CN | 112286047 | | 1/2021 | |

OTHER PUBLICATIONS

"International Search Report (Form PCT/ISA/210) of PCT/CN2021/095598," mailed on Aug. 26, 2021, pp. 1-5.
"Written Opinion of the International Searching Authority (Form PCT/ISA/237) of PCT/CN2021/095598," mailed on Aug. 26, 2021, pp. 1-5.

* cited by examiner

NEURAL NETWORK-BASED NARMA-L2 MULTIVARIABLE CONTROL METHOD

TECHNICAL FIELD

The present invention belongs to the field of aero-engine simulation and control and specifically involves a neural network-based NARMA-L2 multivariable control method.

DESCRIPTION OF RELATED ART

The performance of early aero-engines was not high. They generally only needed to control the fuel flow to keep the engine speed constant. However, with higher requirements on the performance of aero-engines, the number of variables needed to control gradually increases in order to meet the control requirements of the aero-engines. For example, for a turbojet engine with afterburner, the afterburner fuel supply must also be used as a control variable in order to ensure that the nozzle pressure ratio of the turbine remains unchanged. It has been inevitable for the control system of the aero-engine to develop from a single-variable control system to a multi-variable control system.

There are limitations in the high-precision real-time modeling of aero-engines. Excessively accurate descriptions are not appropriate in the actual application of controllers. People often use linearized models in a small neighborhood of the equilibrium state to design controllers. This method satisfies the superposition principle, has a simple calculation process and can generally obtain satisfactory accuracy within the range of normal use. The nonlinear autoregressive-moving average-L2 (NARMA-L2) model has been applied in the field of engine control because it can accurately describe the input-output relationship of the nonlinear system, has a simple structure and can easily calculate the control law.

However, the currently commonly used NARMA-L2 control method is used for single-variable control. In the multivariable control process, decentralized loops are commonly used to form a multivariable control system, which is essentially just a combination of multiple single-variable control systems. This combined control method does not consider the impact of coupling and produces some impact on the control accuracy of the system.

SUMMARY

The technical problem to be solved by the present invention is the defect of the background technology. To solve this problem, the present invention has deduced the NARMA-L2 equation design control law of the multi-input multi-output (MIMO) system and designed a dual-variable controller involving the high-pressure rotating speed and pressure ratio of the turbofan engine to solve the coupling problem brought by the decentralized loop control system. Simulation results show that the controller has good stable and dynamic state performance.

The present invention adopts the following technical solution to solve the above technical problem:

A neural network-based NARMA-L2 multivariable control method, which includes the following steps:
  Step A) Deduce the NARMA-L2 equations and multivariable control law of the MIMO nonlinear discrete system;
  Step B) Design a dual-variable controller involving the high-pressure rotating speed and pressure ratio of a turbofan engine and perform performance verification at design points and non-design points and within the full flight envelope.

As a further optimization scheme for the neural network-based NARMA-L2 multivariable control method of the present invention, the specific sub-steps of Step A) are as follows:
  Step A1) Obtain the NARMA equations of the MIMO system through recursion according to the state space description of the MIMO nonlinear discrete system;
  Step A2) According to the NARMA equations of the MIMO system, perform multivariate Taylor expansion near the equilibrium point and ignore the Taylor high-order remainders above the quadratic term to obtain the NARMA-L2 equations of the MIMO system;
  Step A3) Operate the NARMA-L2 equations of the dual-input dual-output system to obtain the dual-variable control law of the system;

As a further optimization scheme for the neural network-based NARMA-L2 multivariable control method of the present invention, the specific sub-steps of Step B) are as follows:
  Step B1) Take the design of the dual-variable controller of a certain type of turbofan engine as an example. Six non-linear functions in the dual-variable control law are identified offline through six neural networks. The network model adopts the BP-NN network topology and uses the input and output data at the past moment as the input of the neural network and the mapping result of the nonlinear function as the output of the neural network to complete the training;
  Step B2) According to the control law, construct a matrix with the outputs of the nonlinear functions identified by the neural network, and establish a closed-loop controller for the high-pressure rotating speed and pressure ratio of the engine, get the values of the control variables online, and set up a quadratic performance index according to the error between the actual output and the command output to optimize neural network parameters online;
  Step B3) After designing the dual-variable controller, establish the dual-variable closed-loop control system of the turbofan engine and verify its tracking performance at design points and non-design points and within the full flight envelope.

The neural network-based NARMA-L2 dual-variable controller of turbofan engine includes a neural network module and an online optimization module.

The above-mentioned neural network module is used to approximate the nonlinear functions in the control law according to the past input and output data of the system.

The above-mentioned online optimization module is used for the online correction of controller parameters. After the dual-variable controller obtains the controlled variable command at each moment, it calculates the control variable corresponding to the command according to the control law and then inputs it into the engine. The engine then outputs the real value of the controlled variable. In combination with the quadratic performance index, the controlled variable command and the actual output are used for the online correction of the neural network that approximates the nonlinear functions so as to track the trajectory of the engine within the full flight envelope.

Compared with the existing technologies, the above technical solution adopted by the present invention has the following technical effects:

(1) The NARMA-L2 multi-variable control method proposed by the present invention can form a single-loop multi-variable closed-loop control system and can eliminate the coupling impact of multiple variables and improve the control quality;

(2) The neural network-based NARMA-L2 dual-variable controller proposed by the present invention can track any command stably in the full flight envelope, and has good stable and dynamic state performance and shortens the response time of the controller. This verifies the effectiveness of the control method.

DESCRIPTION OF THE EMBODIMENTS

The technical solution of the present invention will be further illustrated in detail below in conjunction with the accompanying drawings.

The idea of the present invention is first to obtain the NARMA equations of the MIMO nonlinear discrete system through recursion and to perform the multivariate Taylor expansion at the equilibrium point to obtain the NARMA-L2 equations of the system, and then to get the control law from the equations through simple derivation. In response to the multi-variable control requirements of the turbofan engine, the dual-variable controller is designed by using the derived NARMA-L2 multi-variable control law to approximate the nonlinear functions in the control law based on the neural network on the basis of the component-level model of the turbofan engine. Compared with the decentralized loop dual-variable control system, the controller eliminates the impact of coupling and has better tracking effects and a little higher accuracy. Compared with other multivariable control methods, this control method has a simple structure and can easily design the control law, and also has good stable and dynamic state performance.

The embodiment of the present invention takes the design of a dual-variable controller involving the high-pressure rotating speed and pressure ratio of a certain type of turbofan engine as an example. The NARMA-L2 multivariable control method includes the following steps:

Step A) Deduce the NARMA-L2 equations and multi-variable control law of the MIMO nonlinear discrete system;

Step B) Design a NARMA-L2 dual-variable controller and perform performance verification at design points and non-design points and within the full flight envelope.

Wherein, the specific sub-steps of Step A) are as follows:

Step A1) The state space of the MIMO nonlinear discrete system is described as:

$$x[k+1] = f(x[k], u[k])$$
$$y_1[k] = h_1(x[k])$$
$$y_2[k] = h_2(x[k])$$
$$\cdots$$
$$y_m[k] = h_m(x[k])$$

Wherein, the input variable $u[k]=[u_1[k]u_2[k] \ldots u_m[k]] \in R^m$, the state vector $x[k] \in R^m$, the output values, $y_1[k] \in R$, $y_2[k] \in R, \ldots, y_m[k] \in R$, the functions $f(\bullet), h_1(\bullet), \ldots, h_m(\bullet) \in C^\infty$, and the original point is the equilibrium state, and k is the time.

In practical applications, because usually only input and output signals are obtained, it is needed to establish the input and output description of the system. Get the following results through recursion:

$$y_1[k] = h_1(x[k]) = \Psi_1(x[k])$$
$$y_1[k+1] = h_1(x[k+1]) = h_1(f(x[k], u[k])) = \Psi_2(x[k], u[k])$$
$$y_1[k+2] = h_1(x[k+2]) = h_1(f(x[k+1], u[k+1]))$$
$$= h_1(f(f(x[k]), u[k]), u[k+1])) = \Psi_3(x[k], u[k], u[k+1])$$
$$\cdots$$
$$y_1[k+n-1] = h_1 \circ f^{n-1}(x[k], u[k]) = \Psi_n(x[k], u[k], \ldots, u[k+n-2])$$

Define:

$y_{1n}[k]=[y_1[k],y_1[k+1], \ldots ,y_1[k+n-1]]=\Psi(x[k],u_{n-1}[k])$ $u_{n-1}[k]=[u[k],u[k+1], \ldots ,u[k+n-2]]$ Then the following equation can be deduced:

$\Psi(x[k],u_{n-1}[k])=Y_{1n}[k]$

Supposed that $\partial\Psi/\partial x$ is nonsingular, due to the existence theorem of the implicit function, it can be deduced that the state vector x[k] can be expressed with $Y_{1n}[k]$ and $u_{n-1}[k]$.

Also:

$$\begin{aligned}
x[k+n] &= f(x[k+n-1], u[k+n-1]) \\
&= f(f(x[k+n-2], u[k+n-2]), u[k+n-1]) \\
&= \ldots \\
&= f \circ f^{n-1}(x[k], u[k]) \\
&= \Phi(x[k], u[k], u[k+1], \ldots, u[k+n-1]) \\
&= \Omega(Y_{1n}[k], u_{n-1}[k], u[k], u[k+1], \ldots, u[k+n-1]) \\
&= \Omega(Y_{1n}[k], u[k], u[k+1], \ldots, u[k+n-1])
\end{aligned}$$

Wherein, $\Phi(\bullet)$ and $\Omega(\bullet)$ are smoothing functions.

According to $y_1[k+n]=h_1(x[k+n])$, the following can be obtained:

$$\begin{aligned}
y_1[k+n] &= h_1(x[k+n]) \\
&= h_1(\Omega(y_1[k], y_1[k+1], \ldots, y_1[k+n-1], u[k], u[k+1], \ldots, u[k+n-1])) \\
&= F(y_1[k], y_1[k+1], \ldots, y_1[k+n-1], u[k], u[k+1], \ldots, u[k+n-1])
\end{aligned}$$

Wherein, $F(\bullet)$, $\Phi(\bullet)$ and $\Omega(\bullet)$ are smoothing functions.

The following can be obtained by the same way:

$$\begin{aligned}
y_2[k+n] &= h_2(x[k+n]) \\
&= h_2(\psi(y_2[k], y_2[k+1], \ldots, y_2[k+n-1], u[k], u[k+1], \ldots, u[k+n-1])) \\
&= G(y_2[k], y_2[k+1], \ldots, y_2[k+n-1], u[k], u[k+1], \ldots, u[k+n-1])
\end{aligned}$$

$$\begin{aligned}
y_m[k+n] &= h_m(x[k+n]) \\
&= h_m(P(y_m[k], y_m[k+1], \ldots, y_m[k+n-1], u[k], u[k+1], \ldots, u[k+n-1])) \\
&= H(y_m[k], y_m[k+1], \ldots, y_m[k+n-1], u[k], u[k+1], \ldots, u[k+n-1])
\end{aligned}$$

Wherein, $\psi(\bullet)$, $G(\bullet)$, $P(\bullet)$ and $H(\bullet)$ are smoothing functions.

Therefore, the NARMA equations of the MIMO system are recursively obtained as:

$$y_1[k+1] = F(y_1[k-n+1], y_1[k-n+2], \ldots, y_1[k], u[k-n+1], u[k-n+2], \ldots, u[k])$$

$$y_2[k+1] = G(y_2[k-n+1], y_2[k-n+2], \ldots, y_2[k], u[k-n+1], u[k-n+2], \ldots, u[k])$$

$$\ldots$$

$$y_m[k+1] = H(y_m[k-n+1], y_m[k-n+2], \ldots, y_m[k], u[k-n+1], u[k-n+2], \ldots, u[k])$$

Wherein, the input variable $u[k]=[u_1[k]u_2[k] \ldots u_m[k]] \in R^m$, the output values $y_1[k] \in R$, $y_2[k] \in R$, ..., $y_m[k] \in R$, the functions, $F(\bullet)$, $G(\bullet)$, $H(\bullet) \in C^\infty$ and k is the time.

Step A2) The NARMA model is actually an accurate mathematical expression of the nonlinear system in the equilibrium state, but it is not suitable for the actual system due to a large amount of calculation, so the NARMA model needs to be approximated and simplified.

Make:

$$M_1 = (y_1[k-n+1], y_1[k-n+2], \ldots, y_1[k], u[k-n+1], u[k-n+2], \ldots, u[k-1])$$

$$M_2 = (y_2[k-n+1], y_2[k-n+2], \ldots, y_2[k], u[k-n+1], u[k-n+2], \ldots, u[k-1])$$

$$\ldots$$

$$M_m = (y_m[k-n+1], y_m[k-n+2], \ldots, y_m[k], u[k-n+1], u[k-n+2], \ldots, u[k-1])$$

By performing multivariate Taylor expansion for the NARMA equations near the equilibrium point and ignoring Taylor high-order remainders, the NARMA-L2 equations of the system are obtained as:

$$y_1[k+1] = F(M_1, u_1[k], u_2[k], \ldots, u_m[k])$$

$$= F(M_1, 0, 0, \ldots, 0)$$

$$+ \left.\frac{\partial F}{\partial u_1[k]}\right|_{(M_1,0,0,\ldots,0)} u_1[k] + \left.\frac{\partial F}{\partial u_2[k]}\right|_{(M_1,0,0,\ldots,0)} u_2[k] + \ldots + \left.\frac{\partial F}{\partial u_m[k]}\right|_{(M_1,0,0,\ldots,0)} u_m[k]$$

$$y_2[k+1] = G(M_2, u_1[k], u_2[k], \ldots, u_m[k])$$

$$= G(M_2, 0, 0, \ldots, 0)$$

$$+ \left.\frac{\partial G}{\partial u_1[k]}\right|_{(M_2,0,0,\ldots,0)} u_1[k] + \left.\frac{\partial G}{\partial u_2[k]}\right|_{(M_2,0,0,\ldots,0)} u_2[k] + \ldots + \left.\frac{\partial G}{\partial u_m[k]}\right|_{(M_2,0,0,\ldots,0)} u_m[k]$$

$$\ldots$$

$$y_m[k+1] = G(M_m, u_1[k], u_2[k], \ldots, u_m[k])$$

$$= G(M_m, 0, 0, \ldots, 0)$$

$$+ \left.\frac{\partial G}{\partial u_1[k]}\right|_{(M_m,0,0,\ldots,0)} u_1[k] + \left.\frac{\partial G}{\partial u_2[k]}\right|_{(M_m,0,0,\ldots,0)} u_2[k] + \ldots + \left.\frac{\partial G}{\partial u_m[k]}\right|_{(M_m,0,0,\ldots,0)} u_m[k]$$

Step A3) Convert the NARMA-L2 equations of the MIMO system into a matrix form:

$$\begin{bmatrix} y_1(k+1) \\ y_2(k+1) \\ \vdots \\ y_m(k+1) \end{bmatrix} = \begin{bmatrix} F_0 \\ G_0 \\ \vdots \\ H_0 \end{bmatrix} + \begin{bmatrix} F_1 & F_2 & \ldots & F_m \\ G_1 & G_2 & \ldots & G_m \\ \vdots & \vdots & & \vdots \\ H_1 & H_2 & \ldots & H_m \end{bmatrix} \begin{bmatrix} u_1(k) \\ u_2(k) \\ \vdots \\ u_m(k) \end{bmatrix}$$

Wherein, $$F_0 = F, \quad F_1 = \left.\frac{\partial F}{\partial u_1(k)}\right|_{(M_1,0,0,\ldots,0)}, \quad F_2 = \left.\frac{\partial F}{\partial u_2(k)}\right|_{(M_1,0,0,\ldots,0)},$$

$$F_m = \left.\frac{\partial F}{\partial u_m(k)}\right|_{(M_1,0,0,\ldots,0)}, \quad G_0 = G, \quad G_1 = \left.\frac{\partial G}{\partial u_1(k)}\right|_{(M_2,0,0,\ldots,0)},$$

$$G_2 = \left.\frac{\partial G}{\partial u_2(k)}\right|_{(M_2,0,0,\ldots,0)}, \quad G_m = \left.\frac{\partial G}{\partial u_m(k)}\right|_{(M_2,0,0,\ldots,0)}, \quad H_0 = H,$$

$$H_1 = \left.\frac{\partial H}{\partial u_1(k)}\right|_{(M_m,0,0,\ldots,0)}, \quad H_2 = \left.\frac{\partial H}{\partial u_2(k)}\right|_{(M_m,0,0,\ldots,0)},$$

$$H_m = \left.\frac{\partial H}{\partial u_m(k)}\right|_{(M_m,0,0,\ldots,0)}$$

represent a nonlinear function respectively, and their input parameters are $(y_1[k-n+1], y_1[k-n+2], \ldots, y_1[k], u[k-1], \ldots, u[k-n+1])$.

Therefore, according to the matrix operation, the multi-variable control law is obtained as:

$$\begin{bmatrix} u_1(k) \\ u_2(k) \\ \vdots \\ u_m(k) \end{bmatrix} = \begin{bmatrix} F_1 & F_2 & \ldots & F_m \\ G_1 & G_2 & \ldots & G_m \\ \vdots & \vdots & & \vdots \\ H_1 & H_2 & \ldots & H_m \end{bmatrix}^{-1} \left( \begin{bmatrix} y_1(k+1) \\ y_2(k+1) \\ \vdots \\ y_m(k+1) \end{bmatrix} - \begin{bmatrix} F_0 \\ G_0 \\ \vdots \\ H_0 \end{bmatrix} \right)$$

The specific sub-steps of Step B) are as follows:

Step B1) Take the fuel flow of the turbofan engine and the critical cross-sectional area of the exhaust nozzle as control variables, and take the high-pressure rotating speed and pressure ratio of the engine as controlled variables to design a dual-variable controller. For the dual-variable control system, its control law is:

$$\begin{bmatrix} u_1(k) \\ u_2(k) \end{bmatrix} = \begin{bmatrix} F_1 & F_2 \\ G_1 & G_2 \end{bmatrix}^{-1} \left( \begin{bmatrix} y_1(k+1) \\ y_2(k+1) \end{bmatrix} - \begin{bmatrix} F_0 \\ G_0 \end{bmatrix} \right)$$

Figure 1:
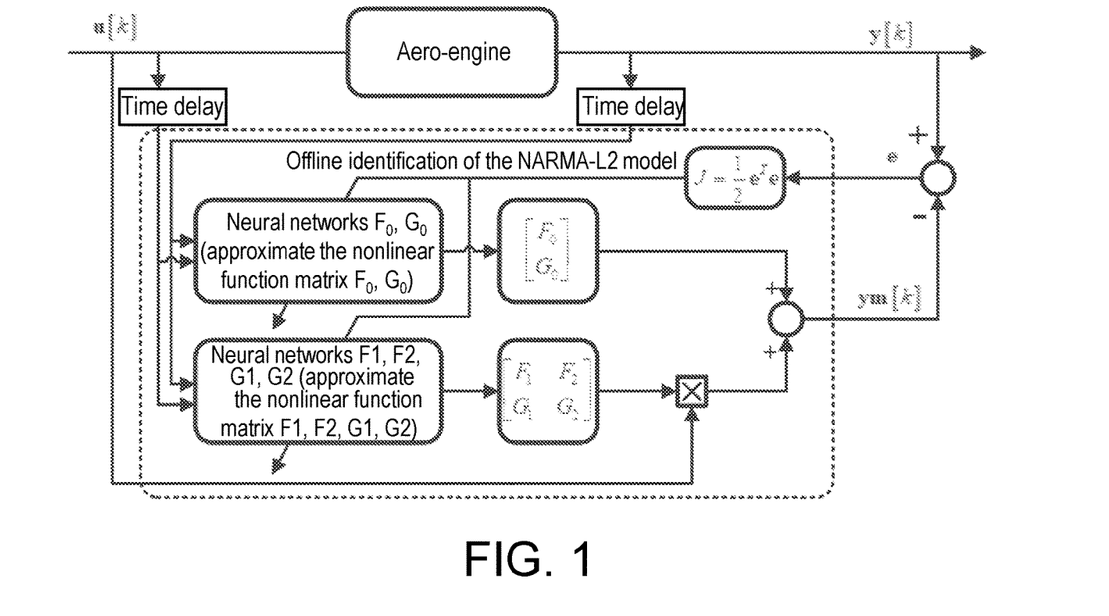
FIG. 1 is the offline identification structure diagram of NARMA-L2 neural network.

Wherein, non-linear functions F0, F1, F2, G0, G1, G2 can be fitted with a neural network, respectively. The six non-linear functions in the dual-variable control law are identified offline through six neural networks, and the network model adopts the BP-NN network topology.

The three neural networks approximating the nonlinear functions F0, F1, F2 all take $M_1=(y_1[k-n+1], y_1[k-n+2], \ldots, y_1[k], u[k-n+1], u[k-n+2], \ldots, u[k-1])$ as the input, and their outputs are the approximate values of $F_0(y_1[k-n+1], y_1[k-n+2], \ldots, y_1[k], u[k-n+1], u[k-n+2], \ldots, u[k-1]), F_1(y_1[k-n+1], y_1[k-n+2], \ldots, y_1[k], u[k-n+1], u[k-n+2], \ldots, u[k-1], u[k]), F_2(y_1[k-n+1], y_1[k-n+2], \ldots, y_1[k], u[k-n+1], u[k-n+2], \ldots, u[k-1], u[k])$, respectively. The turbofan engine is generally recognized as a second-order system, so n is equal to 3, the input neuron of the neural network is 9, the hidden layer's neuron is 25, the output layer's neuron is 1 and the hidden layer's activation function is the tanh function.

The three neural networks approximating the nonlinear functions G0, G1, G2 all take $M_2=(y_2[k-n+1], y_2[k-n+2], \ldots, y_2[k], u[k-n+1], u[k-n+2], \ldots, u[k-1])$ as the input, and their outputs are the approximate values of $G_0(y_2[k-n+1], y_2[k-n+2], \ldots, y_2[k], u[k-n+1], u[k-n+2], \ldots, u[k-1]), G_1(y_2[k-n+1], y_2[k-n+2], \ldots, y_2[k], u[k-n+1], u[k-n+2], \ldots, u[k-1], u[k]), G_2=(y_2[k-n+1], y_2[k-n+2], \ldots, y_2[k], u[k-n+1], u[k-n+2], \ldots, u[k-1], u[k])$, respectively. Also, n is equal to 3, the input neuron of the neural network is 9, the hidden layer's neuron is 25, the output layer's neuron is 1 and the hidden layer's activation function is the tanh function.

The engine model is used to generate a large amount of ground point input and output data. Such data are used as the input of each neural network. The model output of the NARMA-L2 equation is calculated through the output of each neural network, and the error is backpropagated to train each neural network.

The performance index of the model is:

$$J = \frac{1}{2}(e_1^2[k] + e_2^2[k])$$

$$e_1 = y_1[k] - ym_1[k]$$

$$e_2 = y_2[k] - ym_2[k]$$

Wherein, $ym_1$ and $ym_2$ respectively represent the model outputs calculated according to the NARMA-L2 equations, and $y_1$ and $y_2$ respectively represent the actual high-pressure rotating speed and pressure ratio of the engine.

Figure 2:
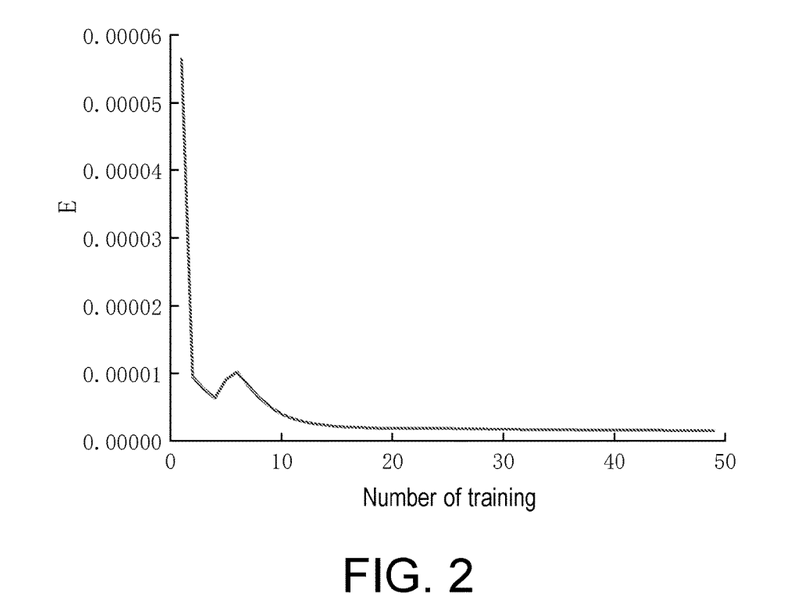
FIG. 2 is the off-line identification error curve diagram of the neural network.

The offline identification structure of the NARMA-L2 model is shown in FIG. 1, where the bolded variables are all matrices, namely $u[k]=[u_1[k]u_2[k]]^T$, $y[k]=[y_1[k]y_2[k]]^T$, $ym[k]=[ym[k]ym_2[k]]^T$, $e=[e_1 \ e_2]^T$. The NARMA-L2 model identification error curve is shown in FIG. 2. As the number of training increases, the neural network identification is basically completed. The theoretical output values calculated with the NARMA-L2 equations are basically consistent with the actual output values.

Figure 3:
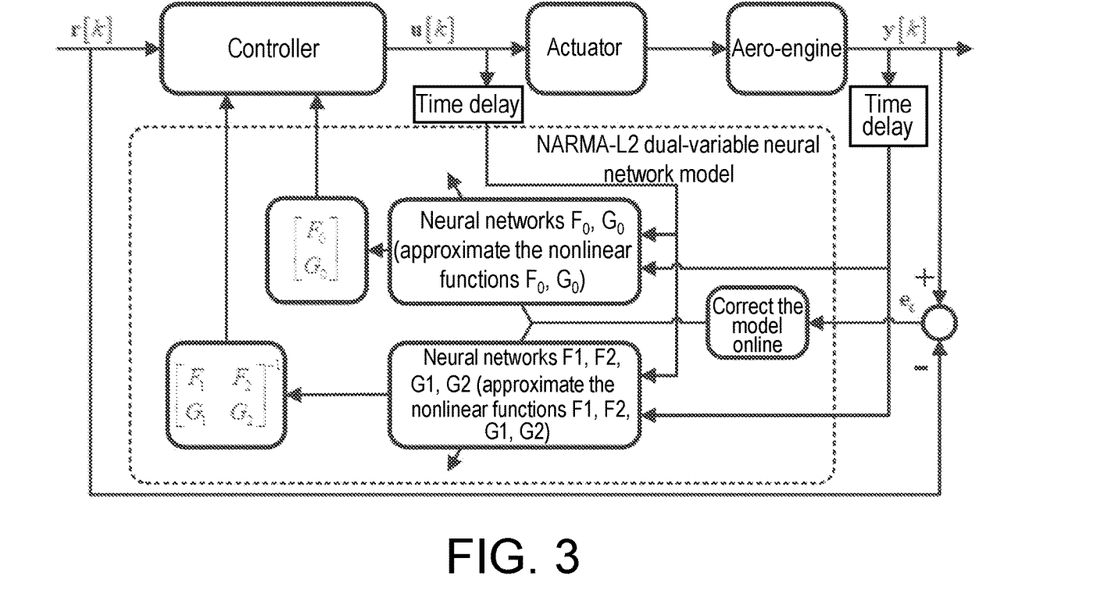
FIG. 3 is the structure diagram of NARMA-L2 dual-variable closed-loop control system.

Step B2) According to the NARMA-L2 dual-variable control law, construct a matrix with the outputs of the nonlinear functions already identified by the neural networks, establish a closed-loop controller for the high-pressure rotating speed and pressure ratio of the engine, and get the values of the control variables online. Moreover, establish a quadratic performance index according to the error between the actual output and the command output, and use the backpropagation algorithm to optimize the neural network parameters online.

The performance index is:

$$J = \frac{1}{2}(e_{c1}^2[k] + e_{c2}^2[k])$$

$$e_{c1} = y_1[k] - r_1[k]$$

$$e_{c2} = y_2[k] - r_2[k]$$

Wherein, $r_1$ and $r_2$ represent the engine's high-pressure rotating speed and pressure ratio commands, respectively; and $y_1$ and $y_2$ represent the engine's actual high-pressure rotating speed and pressure ratio, respectively.

The built control structure is shown in FIG. 3, where the bolded variables are all matrices, namely $u[k]=[u_1[k]u_2[k]]^T$, $y[k]=[y_1[k]y_2[k]]^T$, $r[k]=[k]r_1[k]r_2[k]]^T$, $e_c=[e_{c1} \ e_{c2}]^T$.

Step B3) After the dual-variable controller is designed, the dual-variable closed-loop control system of the turbofan engine is established and its tracking performance is verified at design points and non-design points and within the full flight envelope.

Figure 4:
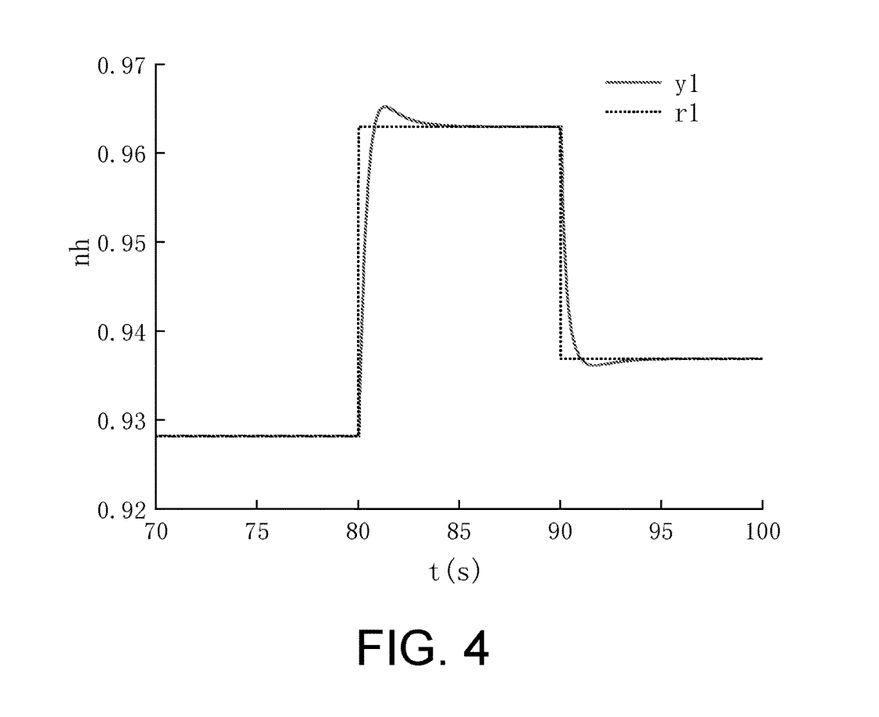
FIG. 4 is the tracking response diagram of the rotating speed outputted at the design point (H=0 m and Ma=0)
Figure 5:
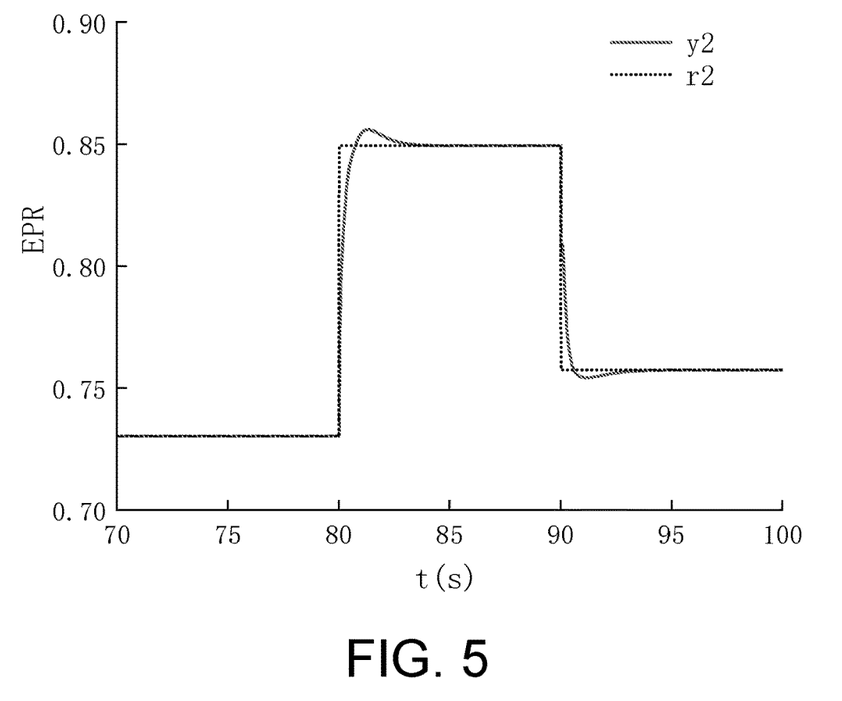
FIG. 5 is the tracking response diagram of the pressure ratio outputted at the design point (H=0 m and Ma=0)

The simulation results under the state of the design point (H=0 m and Ma=0) are shown in FIG. 4 and FIG. 5. It can be seen from the figures that the high-pressure rotating speed and pressure ratio under this state can track the command step signal stably without steady-state error; the overshoot of the high-pressure rotating speed is 6.32% and the adjustment time is less than 2 s; the overshoot of the pressure ratio is 5.53% and the adjustment time is less than 1.4 s, so it has good stable and dynamic state performance.

Figure 6:
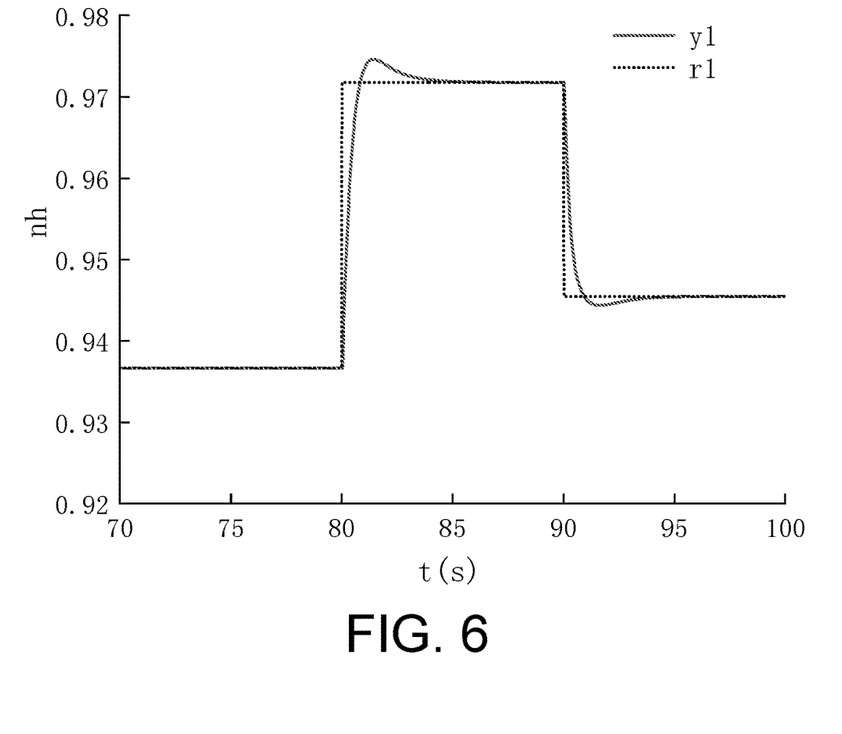
FIG. 6 is the tracking response diagram of the rotating speed outputted at the non-design point (H=4,000 m and Ma=0.8)
Figure 7:
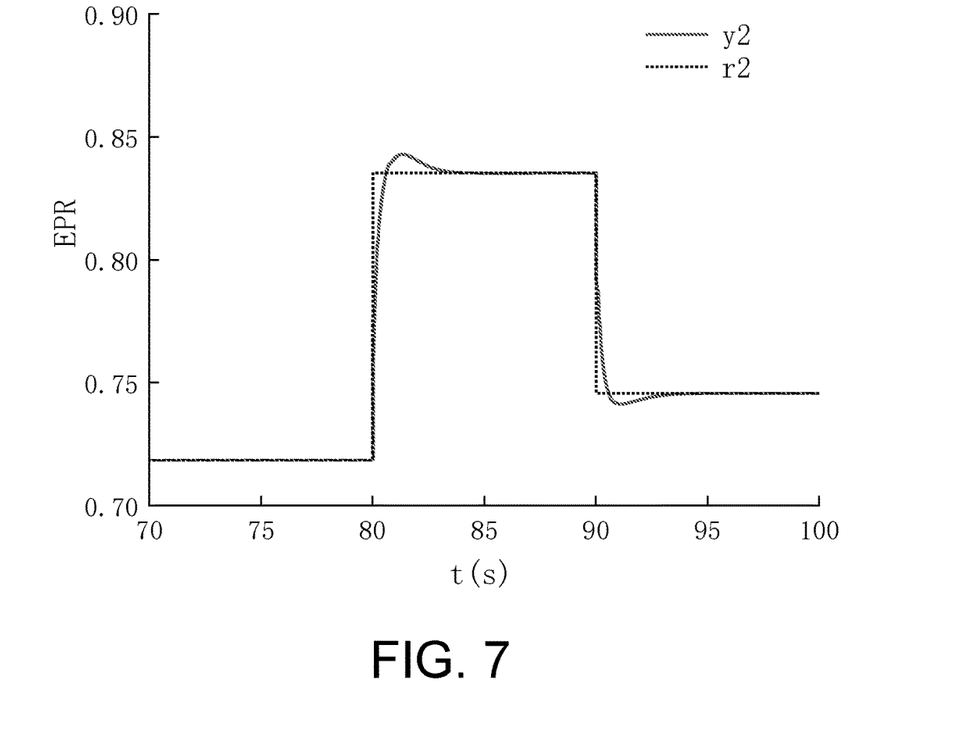
FIG. 7 is the tracking response diagram of the pressure ratio outputted at the non-design point (H=4,000 m and Ma=0.8)

The simulation results at the non-design point (H=4,000 m and Ma=0.8) are shown in FIG. 6 and FIG. 7. It can be seen from the figures that the high-pressure rotating speed and pressure ratio under this state can track the change of the command signal stably, basically without steady-state error; the overshoot of the high-pressure rotating speed is 7.95% and the adjustment time is less than 2.5 s; and the overshoot of the pressure ratio is 6.34% and the adjustment time is less than 2 s, so it has good dynamic characteristics.

Figure 8:
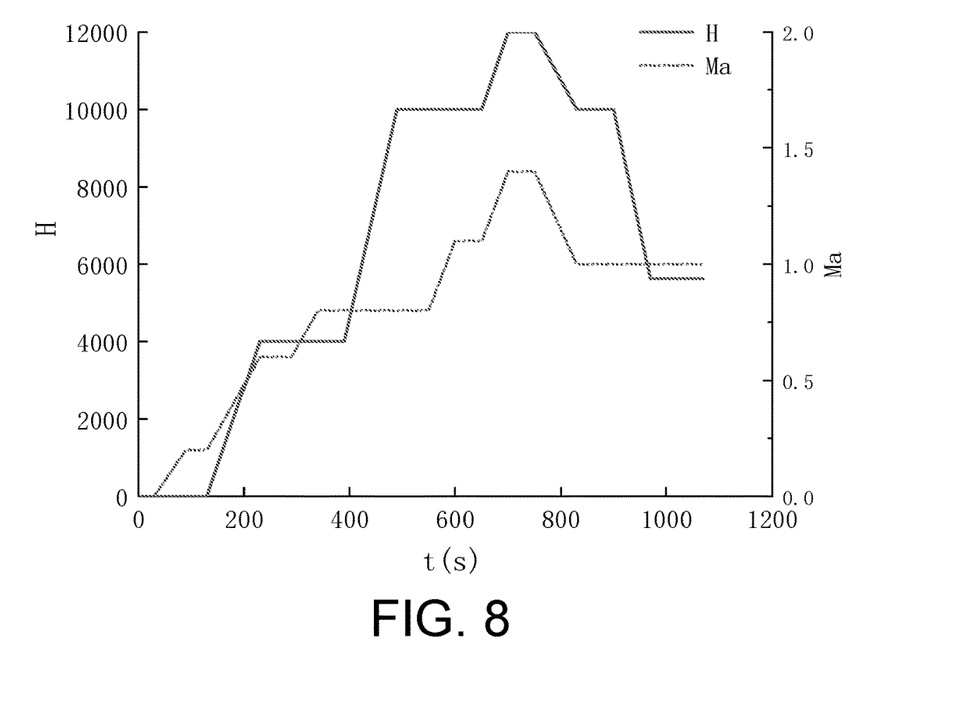
FIG. 8 is the change diagram of altitude and Mach number during the take-off, climb, descent, acceleration and deceleration processes of the aircraft.
Figure 9:
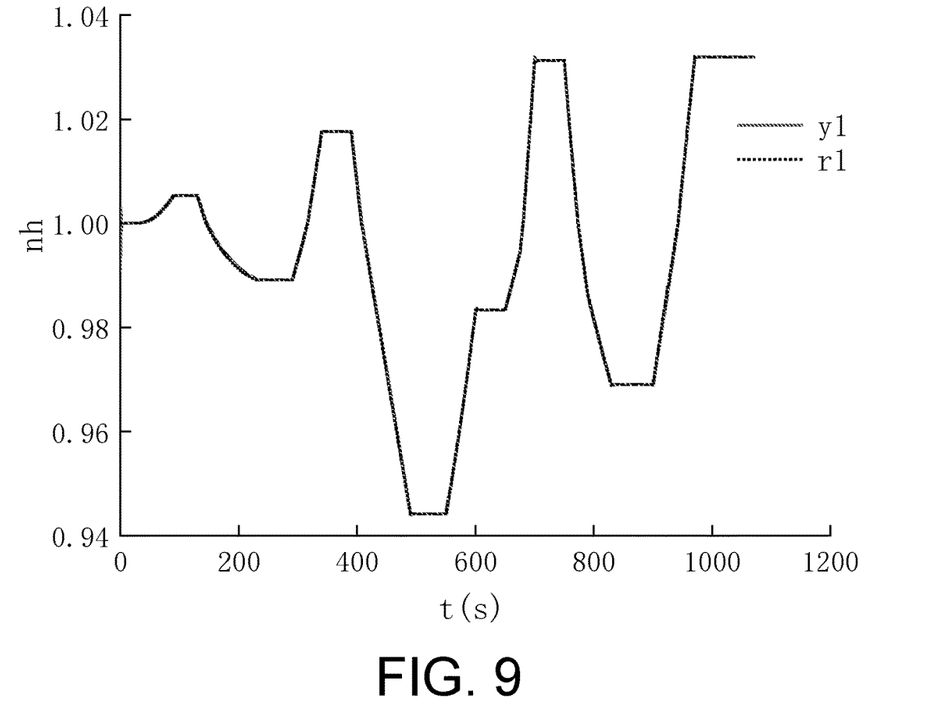
FIG. 9 is the tracking response diagram of the rotating speed outputted during the take-off, climb, descent, acceleration and deceleration processes of the aircraft.
Figure 10:
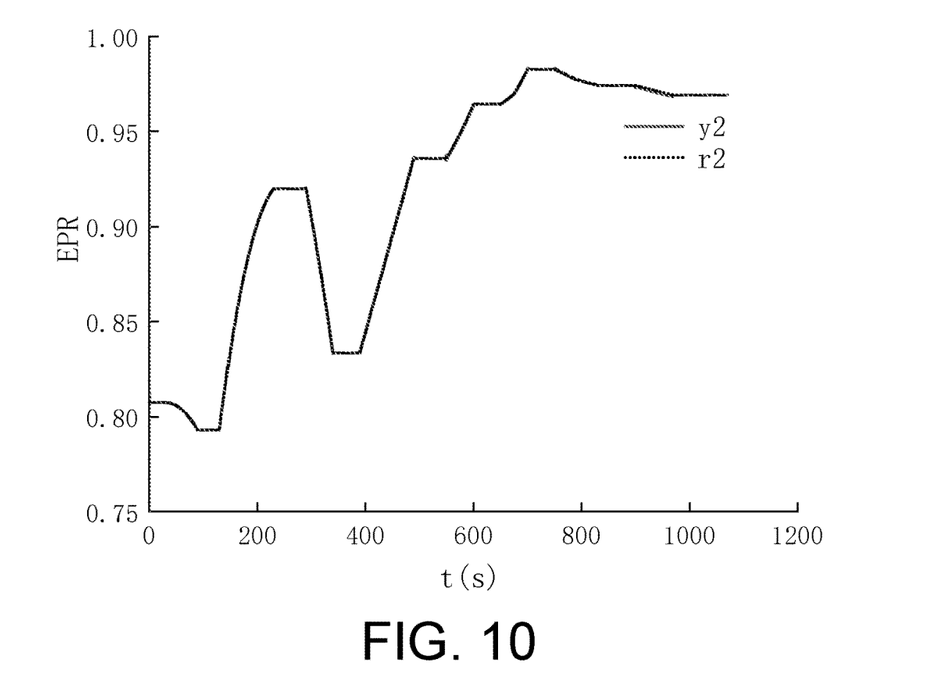
FIG. 10 is the tracking response diagram of the pressure ratio outputted during the take-off, climb, descent, acceleration and deceleration processes of the aircraft.

The changes of the altitude and Mach number during the take-off, climb, descent, acceleration and deceleration process of the aircraft are shown in FIG. 8, and the output tracking effects of the high-pressure rotating speed and pressure ratio are shown in FIG. 9 and FIG. 10. It can be seen from the figures that in various processes, the high-pressure rotating speed and pressure ratio can basically track the change of the command stably, and the system responds quickly, so the model can well meet the needs of the dual-variable control, has good control quality and can adapt to the changes of various working conditions of the engine.

It should be pointed out that what mentioned above is only the embodiment of the present invention, but the protection scope of the present invention is not limited to this. Any changes and replacements that any technician familiar with this technical field can easily make within the technical scope disclosed by the present invention should fall into the protection scope of the present invention. Therefore, the protection scope of the present invention shall be the protection scope of the following claims.

What is claimed is:

1. A neural network-based NARMA-L2 multivariable control method, adapted for controlling a turbofan engine, wherein the turbofan engine comprises sensors, actuators, and a dual-variable controller, the method comprising following steps:
   Step A) obtaining, by a processor, NARMA-L2 equations and a multivariable control law of a multi-input multi-output (MIMO) nonlinear discrete system;
   Step B) using neural networks implemented in the processor to offline identify nonlinear functions in the multivariable control law; using the identified neural networks to design the dual-variable controller, implementing a dual-variable closed-loop control system of the turbofan engine, and measuring, by the sensors, a stable and dynamic state performance of the dual-variable controller by comparing actual engine outputs with commanded values;
   wherein the method further comprising:
   receiving, by the dual-variable controller, sensor measurements of high-pressure rotating speed and pressure ratio from the sensors;
   calculating, by the dual-variable controller, control values using the identified neural networks;
   generating, by the dual-variable controller, control signals based on the control values; and
   transmitting, by the dual-variable controller, to the actuators to physically control the turbofan engine,
   wherein specific sub-steps of the Step A) are as follows:
   Step A1) obtaining NARMA equations of the MIMO system through recursion according to a state space description of a nonlinear discrete system, and applying the NARMA equations to the MIMO system;
   Step A2) according to the NARMA equations of the MIMO system, performing multivariate Taylor expansion near an equilibrium point and ignoring Taylor high-order remainders above a quadratic term to obtain the NARMA-L2 equations of the MIMO nonlinear system;
   Step A3) performing matrix operations by using the NARMA-L2 equations of the MIMO nonlinear system to obtain the multivariable control law of the MIMO system.

2. The neural network-based NARMA-L2 multivariable control method according to claim 1, wherein specific sub-steps of the Step B) are as follows:
   Step B1) at first, taking a fuel flow of the turbofan engine and a critical cross-sectional area of an exhaust nozzle as control variables, and taking a high-pressure rotating speed and a pressure ratio of the turbofan engine as controlled variables, using an engine model to generate input and output data, and using the neural networks to offline identify the nonlinear functions in the control law according to the input and output data;
   Step B2) according to the control law, constructing a matrix with outputs of the nonlinear functions already identified by the neural networks, establishing a closed-loop controller for the high-pressure rotating speed and the pressure ratio of the turbofan engine, and obtain values of the control variables online, establishing a quadratic performance index according to an error between an actual output and a command output, and optimizing neural network parameters online;
   Step B3) after the dual-variable controller is designed, verifying a tracking performance of the dual-variable controller at design points and non-design points and within a full flight envelope.

3. The neural network-based NARMA-L2 multivariable control method according to claim 1, wherein the multivariable control law of the system in the Step A3) is:

$$\begin{bmatrix} u_1(k) \\ u_2(k) \\ \vdots \\ u_m(k) \end{bmatrix} = \begin{bmatrix} F_1 & F_2 & \cdots & F_m \\ G_1 & G_2 & \cdots & G_m \\ \vdots & \vdots & & \vdots \\ H_1 & H_2 & \cdots & H_m \end{bmatrix}^{-1} \left( \begin{bmatrix} y_1(k+1) \\ y_2(k+1) \\ \vdots \\ y_m(k+1) \end{bmatrix} - \begin{bmatrix} F_0 \\ G_0 \\ \vdots \\ H_0 \end{bmatrix} \right)$$

wherein, $F_0 = F$, $F_1 = \frac{\partial F}{\partial u_1(k)}\bigg|_{(M_1,0,0,\ldots,0)}$, $F_2 = \frac{\partial F}{\partial u_2(k)}\bigg|_{(M_1,0,0,\ldots,0)}$, $F_m = \frac{\partial F}{\partial u_m(k)}\bigg|_{(M_1,0,0,\ldots,0)}$, $G_0 = G$, $G_1 = \frac{\partial G}{\partial u_1(k)}\bigg|_{(M_2,0,0,\ldots,0)}$, $G_2 = \frac{\partial G}{\partial u_2(k)}\bigg|_{(M_2,0,0,\ldots,0)}$, $G_m = \frac{\partial G}{\partial u_m(k)}\bigg|_{(M_2,0,0,\ldots,0)}$, $H_0 = H$, $H_1 = \frac{\partial H}{\partial u_1(k)}\bigg|_{(M_m,0,0,\ldots,0)}$, $H_2 = \frac{\partial H}{\partial u_2(k)}\bigg|_{(M_m,0,0,\ldots,0)}$, $H_m = \frac{\partial H}{\partial u_m(k)}\bigg|_{(M_m,0,0,\ldots,0)}$.

4. The neural network-based NARMA-L2 multivariable control method according to claim 2, wherein a function of the quadratic performance index established in the Step B2) is:

$$J = \frac{1}{2}\left(e_{c1}^2[k] + e_{c2}^2[k]\right)$$
$$e_{c1} = y_1[k] - r_1[k]$$
$$e_{c2} = y_2[k] - r_2[k]$$

wherein, $r_1$ and $r_2$ represent high-pressure rotating speed and commands of the pressure ratio of the turbofan engine, respectively; and $y_1$ and $y_2$ represent actual high-pressure rotating speed and actual pressure ratio of the turbofan engine, respectively;

after the dual-variable controller obtaining a command of controlled variable at each moment, the dual-variable controller calculates the control variable corresponding to the command according to the control law and inputs the control variable into the engine, the engine then outputs a real value of the controlled variable, in combination with the quadratic performance index, the command of the controlled variable and an actual output value are used for an online correction of the neural network that approximates the nonlinear function, so as to achieve the adaptive control of the engine in the full flight envelope.

5. The neural network-based NARMA-L2 multivariable control method according to claim 1, wherein the state space description of the MIMO nonlinear discrete system in the Step A1) is defined as:

$$x[k+1] = f(x[k], u[k])$$
$$y_1[k] = h_1(x[k])$$
$$y_2[k] = h_2(x[k])$$
$$\ldots$$
$$y_m[k] = h_m(x[k])$$

wherein, $u[k] = [u_1[k]\ u_2[k]\ \ldots\ u_m[k]] \in R^m$ is a control variable input of the system, $y_1[k] \in R, y_2[k] \in R, \ldots, y_m[k] \in R$ is a controlled variable output of the system, m represents a number of the selected control variables and controlled variables, a state vector $x[k] \in R^n$, n represents a dimension of the state vector, functions $f(\cdot), h_1(\cdot), \ldots, h_m(\cdot) \in C^\infty$, and an original point is an equilibrium state, and k represents time.

6. The neural network-based NARMA-L2 multivariable control method according to claim 5, wherein the NARMA equations of the MIMO system are expressed as:

$$y_1[k+1] = F(y_1[k-n+1], y_1[k-n+2], \ldots, y_1[k], u[k-n+1], u[k-n+2], \ldots, u[k])$$

$$y_2[k+1] = G(y_2[k-n+1], y_2[k-n+2], \ldots, y_2[k], u[k-n+1], u[k-n+2], \ldots, u[k])$$

$$y_m[k+1] = H(y_m[k-n+1], y_m[k-n+2], \ldots, y_m[k], u[k-n+1], u[k-n+2], \ldots, u[k])$$

wherein, an input variable $u[k] = [u_1[k]\ u_2[k]\ \ldots\ u_m[k]] \in R^m$, output values $y_1[k] \in R, y_2[k] \in R, \ldots, y_m[k] \in R$, functions $F(\cdot), G(\cdot), H(\cdot) \in C^\infty$, and k represents time.

7. The neural network-based NARMA-L2 multivariable control method according to claim 6, wherein the NARMA-L2 equations obtained in Step A2) are:

$$y_1[k+1] = F(M_1, u_1[k], u_2[k], \ldots, u_m[k])$$
$$= F(M_1, 0, 0, \ldots, 0) + \left.\frac{\partial F}{\partial u_1[k]}\right|_{(M_1, 0, 0, \ldots, 0)} u_1[k] + \left.\frac{\partial F}{\partial u_2[k]}\right|_{(M_1, 0, 0, \ldots, 0)} u_2[k] + \ldots + \left.\frac{\partial F}{\partial u_m[k]}\right|_{(M_1, 0, 0, \ldots, 0)} u_m[k]$$

$$y_2[k+1] = G(M_1, u_1[k], u_2[k], \ldots, u_m[k]) = G(M_2, 0, 0, \ldots, 0) + \left.\frac{\partial G}{\partial u_1[k]}\right|_{(M_2, 0, 0, \ldots, 0)} u_1[k] + \left.\frac{\partial G}{\partial u_2[k]}\right|_{(M_2, 0, 0, \ldots, 0)} u_2[k] + \ldots + \left.\frac{\partial G}{\partial u_m[k]}\right|_{(M_2, 0, 0, \ldots, 0)} u_m[k]$$

$$\ldots$$

$$y_m[k+1] = H(M_m, u_1[k], u_2[k], \ldots, u_m[k]) = H(M_m, 0, 0, \ldots, 0) + \left.\frac{\partial H}{\partial u_1[k]}\right|_{(M_m, 0, 0, \ldots, 0)} u_1[k] + \left.\frac{\partial H}{\partial u_2[k]}\right|_{(M_m, 0, 0, \ldots, 0)} u_2[k] + \ldots + \left.\frac{\partial H}{\partial u_m[k]}\right|_{(M_m, 0, 0, \ldots, 0)} u_m[k]$$

wherein, $$M_1 = (y_1[k-n+1], y_1[k-n+2], \ldots, y_1[k], u[k-n+1], u[k-n+2], \ldots, u[k-1])$$

$$M_2 = (y_2[k-n+1], y_2[k-n+2], \ldots, y_2[k], u[k-n+1], u[k-n+2], \ldots, u[k-1])$$

$$\ldots$$

$$M_m = (y_m[k-n+1], y_m[k-n+2], \ldots, y_m[k], u[k-n+1], u[k-n+2], \ldots, u[k-1]).$$

8. A method of controlling a turbofan engine, adapted for a controller of the turbofan engine, the method comprising:

receiving, from the turbofan engine, data representing an actual high-pressure rotating speed and an actual pressure ratio of the turbofan engine;

generating, by the controller, one or more control signals based on a multivariable control law derived from a neural network-based NARMA-L2 model, wherein the neural network-based NARMA-L2 model defines a multi-input multi-output (MIMO) relationship that accounts for coupling effects between control variables and controlled variables, wherein the control variables comprises a fuel flow of the turbofan engine and a critical cross-sectional area of an exhaust nozzle of the turbofan engine, and the controlled variables comprises the actual high-pressure rotating speed and the actual pressure ratio; and applying the one or more control signals to one or more actuators of the turbofan engine to thereby cause the actual high-pressure rotating speed to track a desired high-pressure rotating speed, and to simultaneously cause the actual pressure ratio to track a desired pressure ratio.

9. The method of claim 8, wherein the multivariable control law is derived by a process comprising:

performing a multivariate Taylor expansion on a set of nonlinear autoregressive-moving average (NARMA) equations of the turbofan engine; and approximating the NARMA equations by ignoring terms of the multivariate Taylor expansion above a quadratic order to obtain the NARMA-L2 model.

10. The method of claim 8, wherein the neural network-based NARMA-L2 model comprises a plurality of nonlinear functions approximated by a corresponding plurality of neural networks, and wherein the method further comprises:

identifying the plurality of nonlinear functions by training the plurality of neural networks with input and output data generated from an engine model prior to applying the one or more control signals to the one or more actuators.

11. The method of claim 8, further comprising:

optimizing parameters of the neural networks online based on a quadratic performance index calculated from:
- a first error between the actual high-pressure rotating speed and the desired high-pressure rotating speed; and
- a second error between the actual pressure ratio and the desired pressure ratio.

12. A turbofan engine system, comprising:

a turbofan engine;

one or more sensors configured to measure an actual high-pressure rotating speed and an actual pressure ratio of the turbofan engine;

one or more actuators configured to adjust a fuel flow and a critical cross-sectional area of an exhaust nozzle of the turbofan engine; and a controller operably coupled to the one or more sensors and the one or more actuators, the controller comprising:

one or more processors; and a memory storing instructions, wherein the one or more processors execute the instructions for being configured to:

receive, from the one or more sensors, data representing the actual high-pressure rotating speed and the actual pressure ratio;

generate one or more control signals based on a multivariable control law derived from a neural network-based NARMA-L2 model, wherein the neural network-based NARMA-L2 model defines a multi-input multi-output (MIMO) relationship that accounts for coupling effects between control variables comprising the fuel flow and the critical cross-sectional area of the exhaust nozzle, and controlled variables comprising the high-pressure rotating speed and the pressure ratio; and transmit the one or more control signals to the one or more actuators to thereby cause the actual high-pressure rotating speed to track a desired high-pressure rotating speed, and to simultaneously cause the actual pressure ratio to track a desired pressure ratio.

13. The system of claim 12, wherein the instructions, when executed by the one or more processors, further cause the controller to derive the multivariable control law by a process comprising:

performing a multivariate Taylor expansion on a set of nonlinear autoregressive-moving average (NARMA) equations of the turbofan engine; and approximating the NARMA equations by ignoring terms of the multivariate Taylor expansion above a quadratic order to obtain the NARMA-L2 model.

14. The system of claim 12, wherein the neural network-based NARMA-L2 model comprises a plurality of nonlinear functions approximated by a corresponding plurality of neural networks, and wherein the instructions, when executed by the one or more processors, further cause the controller to:

identify the plurality of nonlinear functions by training the plurality of neural networks with input and output data generated from an engine model prior to transmitting the one or more control signals to the one or more actuators.

15. The system of claim 12, wherein the instructions, when executed by the one or more processors, further cause the controller to:

optimize parameters of the neural networks online based on a quadratic performance index calculated from:
- a first error between the actual high-pressure rotating speed and the desired high-pressure rotating speed; and
- a second error between the actual pressure ratio and the desired pressure ratio.

* * * * *